Jan. 19, 1943. S. I. MacDUFF 2,308,885
BRAKE
Filed March 22, 1941 2 Sheets-Sheet 1
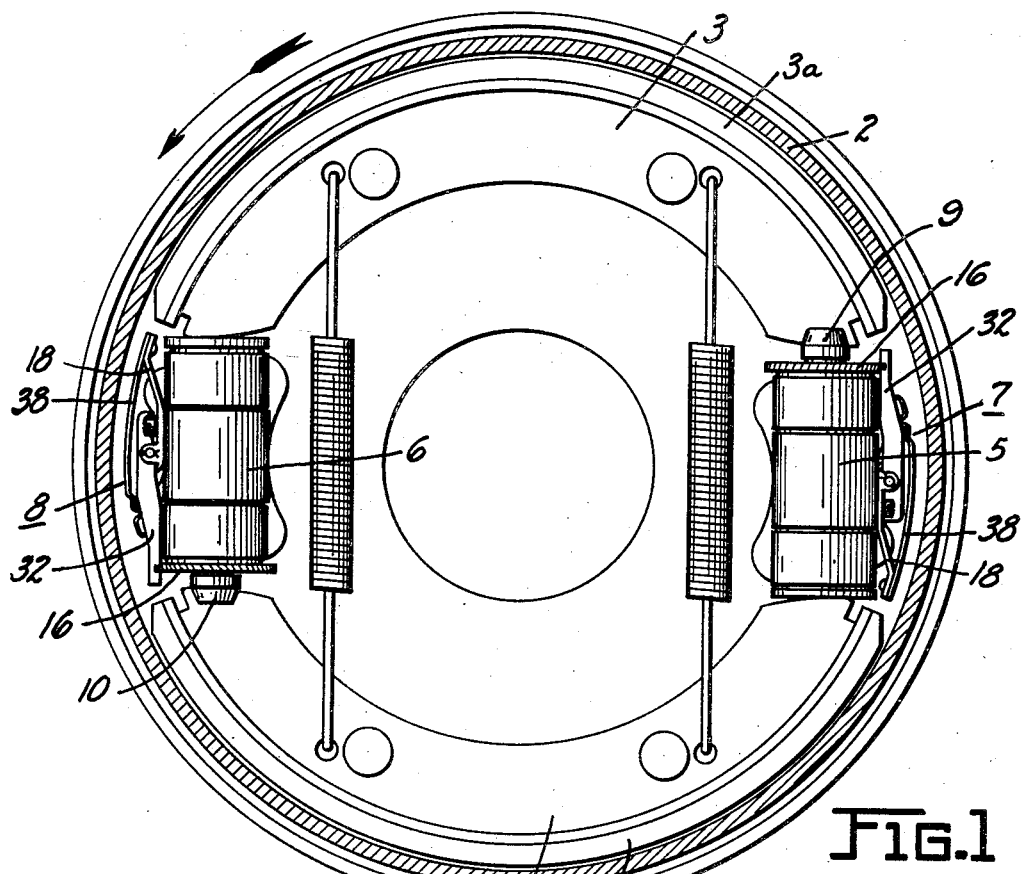
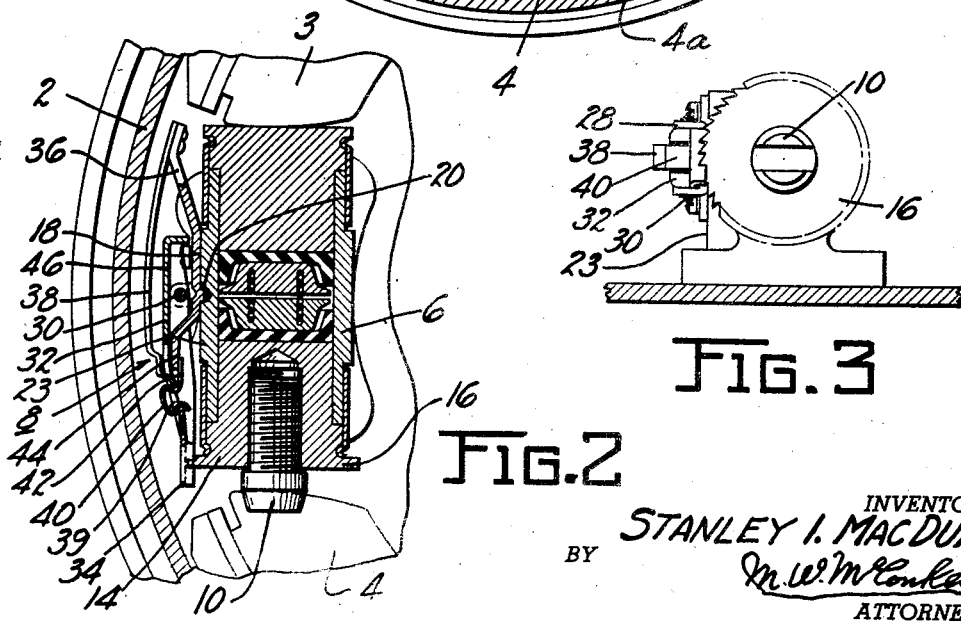
INVENTOR
STANLEY I. MacDUFF
BY
M. W. McConkey
ATTORNEY Jan. 19, 1943.　　　　S. I. MacDUFF　　　　2,308,885
BRAKE
Filed March 22, 1941　　　2 Sheets—Sheet 2
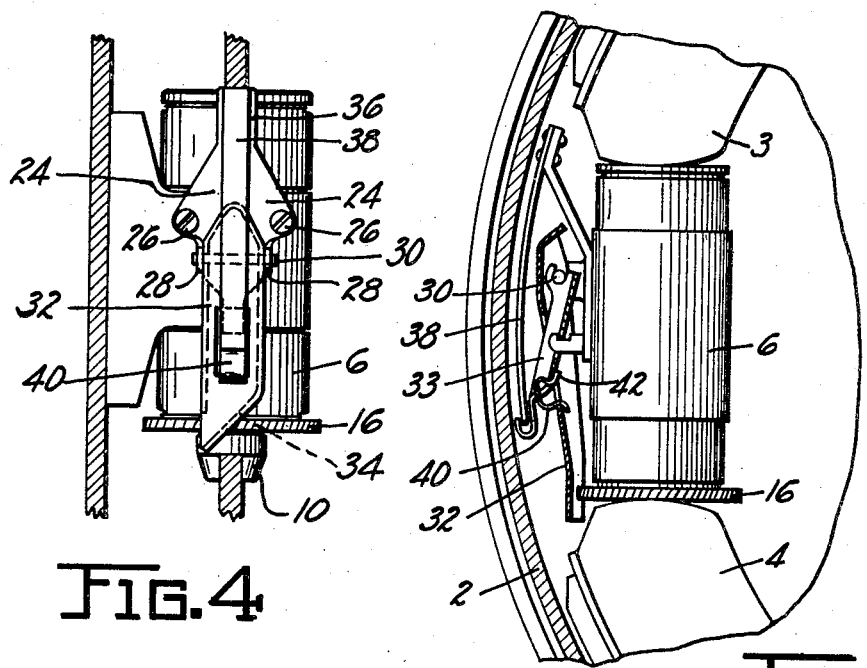
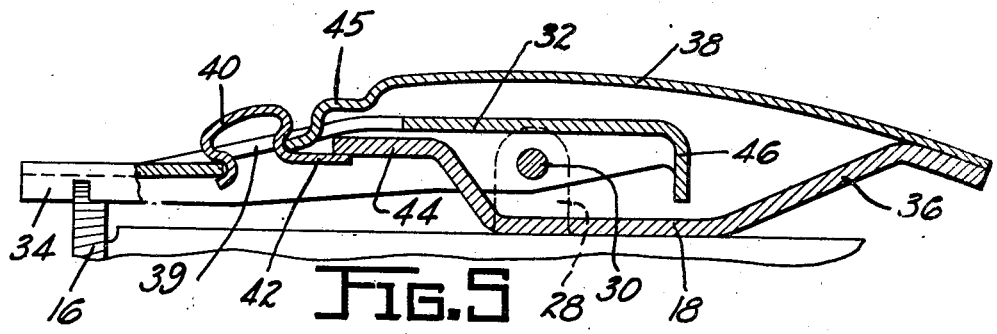
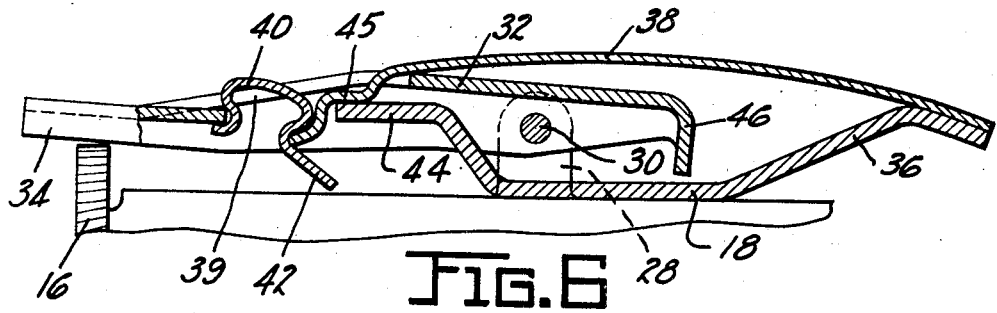
INVENTOR
STANLEY I. MACDUFF
ATTORNEY Patented Jan. 19, 1943

2,308,885

UNITED STATES PATENT OFFICE 2,308,885

BRAKE

Stanley I. MacDuff, South Bend, Ind., assignor to Bendix Aviation Corporation, South Bend, Ind., a corporation of Delaware Application March 22, 1941, Serial No. 384,639

13 Claims. (Cl. 188—79.5)

This invention relates to brakes; more particularly to means for automatically adjusting the position of shoes of a vehicle brake to compensate for wear of the lining of such shoes.

In the operation of vehicle brakes, the brake lining is subject to wear with use and as the lining wears, the position of the shoes relative to the drums is such that usually greater and greater pedal movement is required to operate the brakes. At last the wear may become so great that it is impossible to apply the brakes because the normal stroke of the pedal will not move the shoes enough to compensate for the lining wear. In such cases it is necessary usually to have the brakes adjusted at a service station.

It has previously been proposed to provide means for automatically adjusting such brakes to compensate for lining wear. Such automatic adjusting means are arranged to move the shoes toward the brake drum as the lining wears so as to maintain a substantially constant clearance between the lining outer surface and the drum. Most of these previous proposals do not take into consideration the fact that the automatic adjustment will adjust whenever there is sufficient clearance between the brake and the drum regardless of whether that clearance is caused by lining wear or by drum expansion due to heat. Proposals have also been made to provide an automatic adustment so arranged that when the drum is hot, the automatic adjustment will not operate because of the operation of a thermostatic element which prevents adjustment at such times. None of the prior designs, so far as I am aware, have been capable of automatically adjusting a brake of the type disclosed in this application whenever such adjustment was required because of lining wear without also making adjustment when there was drum expansion due to heat. The brake disclosed in the operation is a two-shoe brake in which each shoe anchors at its opposite ends depending upon the direction of the rotation of the wheel and drum.

One of the objects of my invention is, therefore, to provide a brake of the type in which two shoes separately anchor on opposite ends depending upon the direction of rotation of the drum with an automatic adjustment so arranged that it is not actuated when the drum is expanded due to heat.

A further object of the invention is the provision of a novel automatic adjustment device so arranged as to avoid adjustment when the drum expands due to heat.

A further object of the invention is the provision of snap action in such an automatic adjustment device. This snap action may be accomplished by a pawl and ratchet combination which is definite and positive in its action, i. e., the pawl is either completely in contact with the teeth of the ratchet or completely out of contact so that destruction of tooth points or pawl edge by partial engagement during adjusting of the brake is avoided.

Further, it is an object of my invention to provide a bi-metal device for preventing overadjustment of the brake, which device will be very close to the brake drum so that it will be extremely sensitive to the heat conditions prevailing in the drum, and which will further be so disposed that the more quickly expansible of the two metal elements will be nearest the drum. As a general rule the materials which have the highest coefficient of absorption with respect to heat also have the highest coefficient of expansion. This means that, in a thermostatic device of the bi-metallic type having the less expansible of the metals near the drum or center of heat, the bi-metallic device will respond slowly because the heat must pass through the metal having the lower coefficient of absorption before it affects the metal having the higher coefficiency of expansion and absorption. My device is so arranged that the more expansible of the metals is nearest the drum. Further, my device is so arranged that the thermostatic member, which prevents overadjustment of the brake, is extremely close to the inner surface of the brake drum where the greatest heat is developed during braking.

My device is advantageous in that the automatic adjustment parts thereof are removable from the brake assembly and can be replaced as a unit. Also the adjustment described herein has relatively few and simple parts, so that it is comparatively inexpensive and uncomplicated.

A feature of the invention is a piston for a hydraulic cylinder provided with threads by means of which its connection with the brake shoe may be extended.

Further objects and features of the invention will be apparent from a consideration of the following specification and claims in connection with the accompanying drawings, in which:

Figure 1 is a view in elevation of a brake drum equipped with a brake constructed according to my invention;

Figure 2 is a fragmentary view in section of a wheel cylinder such as that shown in Figure 1;

Figure 3 is a view in elevation of the cylinder shown in Figure 2 taken at right angles to Figure 2;

Figure 4 is a view in end elevation of the cylinder shown in Figure 2;

Figure 5 is a diagrammatic view to illustrate the action of the snap spring, and showing the snap spring in its position when the drum is cool;

Figure 6 is a view similar to Figure 5 showing the spring in its position when the drum is heated; and Figure 7 is a section showing a modification of the cylinder and adjustment means of Figure 2, the modification including a lever to eliminate stress of the bi-metal element as a strut.

Referring in detail to the drawings, it may be seen that I have shown in Figure 1, a brake drum 2 in which there are positioned brake shoes 3 and 4 arranged to be actuated by hydraulic wheel cylinders 5 and 6. The brake shoes 3 and 4 are of the individually shiftable type and anchor when the brakes are applied on one or the other of the wheel cylinders 5 and 6 according to the direction of drum rotation. Springs 5a and 6a return the shoes to released position after application. Associated with the wheel cylinders 5 and 6 are adjusting mechanisms 7 and 8 arranged to automatically adjust the position of the brake shoes as will be described more in detail later. The shoes 3 and 4 are similar to each other, the cylinders 5 and 6 are similar to each other, and adjusting mechanisms 7 and 8 are similar to each other. The shoes 3 and 4 are of conventional design and further description may be unnecessary except to say that they are provided with linings 3a and 4a respectively. The whole brake shown is of more or less conventional design and further description thereof may be unnecessary except to say that the adjusting screws 9 and 10 are slotted to receive the toes of the shoes 3 and 4, and the hydraulic pistons such as 14 can be rotated by means of a toothed ratchet flange such as 16 to make the desired adjustment of the brake released position of the shoes. Inasmuch as the cylinders and adjusting mechanisms are similar, description of one of each is believed sufficient.

Cylinder 6 and adjusting mechanism 8 are shown on an enlarged scale in Figures 2, 3, 4 and 5. Figure 2 is in section and shows the internal construction of the cylinder as well as the detailed structure of the adjusting mechanism which is also well shown in Figure 4. Reference is therefore especially made to Figures 2 and 4. The actual adjusting device 8, which is identical with the adjusting device 7, is a unitary structure to simplify replacement and repair. It comprises a stamped base or bracket 18 which has a punched boss 20 to position it on the hydraulic cylinder 6, and two ears 24 through which screws 26 are inserted to secure it to the cylinder 6. The cylinder 6 is provided with a flat face 23 adjacent the brake drum for receiving the adjusting device. Two ears 28 on the base 18 are bent up to form a yoke, in which is pivoted by means of a pin 30 an adjusting lever 32. The end of the adjusting lever 32 is bent down to form a flange 34 at an angle to the axis of the lever. The flange 34 engages the teeth of the ratchet flange 16, these teeth being arranged at the same angle as the said flange 34.

The base 18 is formed with a finger 36 to which is pivoted a bi-metal element 38, which is adapted to bend inwardly when heated since a strip of relatively highly expansible metal which faces toward the drum is secured to or integral with a metal strip having a relatively low coefficient of expansion which faces toward the center of the brake assembly. The element 38 extends over the lever 32 and engages it by means of a small C-spring 40 which is compressed between the end of the bi-metal element 38 and one edge of a rectangular opening 39 cut in the lever 32. The spring 40 has a projection 42 which bears against another finger 44 projecting from the base 18. The bi-metal element is formed with a shoulder at 45 which engages the outer surface of finger 44 at the extreme inward limit of motion. The lever 32 is also formed with a projection 46 which contacts the base 18 to form a stop. The bi-metal element should be coated with a black radiant heat absorbing material especially on the surface which faces the drum.

When the brake is applied in the forward direction (indicated by the arrow) the flange 34 of adjusting lever 32 is caused to rise up on the inclined face of a tooth on the ratchet flange 16. It is understood that the flange 16 moves out in applying the brake. If the brake is worn, the flange 34 will fall into the next notch so that, upon release of the brake, the force of the return springs causes rotation of the flange 16 and a screwing out of the adjusting screw 10.

If an application sufficiently long and hard to cause severe heating and expansion of the drum is made, the bi-metal element receives heat (probably, mostly by radiation directly from the drum) and it bows or bends inwardly. The bi-metal element 38 and the spring 40 form a snap action toggle which suddenly raises the lever 32 when the bi-metal has bowed inward sufficiently. The projection 46 limits the upward motion of the adjusting lever 32. Similarly the finger 44 on the base limits the outward movement of projection 42 of the spring 40 and the inward movement of bi-metal 38. Figure 5 shows the position of the spring when the drum is cool and Figure 6 when the drum is hot and together clearly illustrate the action of the parts.

Some of the advantages of this device are those pointed out in the following paragraphs.

The snap action of the lever assures that the flange fully engages the teeth of the ratchet flange so that destruction of tooth points or flange edge by partial engagement during adjustment is avoided.

The bi-metal is placed as close as practicable to the drum surface so as to absorb quickly the heat of the drum by radiation and to act promptly. Moreover the expanding metal (as, for example, brass) surface of the bi-metal is next to the drum so that heat absorbed from the drum immediately effects expansion. This arrangement is much more effective than if the non-expanding (as, for example, Invar) surface of the bi-metal were next to the drum whereupon it would be necessary that the heat from the drum be conducted through the Invar to the brass surface before action would occur.

The device is removable and replaceable as a unit and has relatively few and simple parts.

The device shown in Figure 7 differs only slightly from the device of Figure 2. In Figure 7 an intermediate lever 33 is used to transmit force between the bi-metal element 38 and the C-spring 40. The lever 33 is pivoted at 30 and is connected at one end to the bi-metal element 38 and intermediate the connection to the bi-metal element and the pivot contacts the C-spring 40. This modification of my device has the advantage that no strut action is required of the bi-metal element. There is no danger that the bi-metal element can be forced by the resistance of the spring to bow at its center and be forced outward toward the brake drum.

In operation, when the bi-metal element is caused by heat to bend inwardly it swings the lever 33 about its pivot, applying force to compress the C-spring and to swing the flange 42 of the spring past dead-center of the toggle. Once the movement of the spring is sufficient it swings the adjusting lever 32 to carry the pawl away from the ratchet teeth.

It is to be understood that the above described embodiments of my invention are for the purpose of illustration only and various changes may be made therein without departing from the spirit and the scope of the invention.

I claim:

1. A wheel cylinder assembly for operating a hydraulic brake or the like comprising a cylinder, a piston in the cylinder provided with a threaded bore, a screw threaded into the bore, means for inhibiting the screw from turning, means for rotating the piston in the cylinder, and a thermostatic element for preventing the operation of the last named means.

2. For use with a vehicle brake which comprises a drum, brake shoes, and means for moving the brake shoes into contact with the drum, the combination of means for taking the anchoring torque of said shoes, means for automatically adjusting the relative position of said shoes and said anchors, and means comprising a snap action toggle device for eliminating the automatic adjustment means when the drum becomes heated.

3. For use with a brake for a vehicle which comprises a drum, brake shoes and means for moving the brake shoes into contact with the drum, the combination of means for taking the anchoring torque of said shoes, means for automatically adjusting the relative position of said shoes and said anchors, and means comprising a thermostat and a toggle spring for eliminating the automatic adjustment means when the drum becomes heated.

4. In a brake for an automobile, a brake drum, a pair of identical shoes in said drum, a pair of anchors interposed between said shoes each comprising means to receive the anchoring torque of one shoe in one direction of rotation of the drum and of the other shoe in the opposite direction of rotation of the drum, means to automatically adjust the relative position of said shoes and said anchors to compensate for wear on the shoes, and means comprising a thermostat and a snap action toggle spring for preventing the operation of said automatic adjustment means when the drum is heated.

5. A wheel cylinder assembly for operating a hydraulic brake or the like comprising a cylinder, a piston in the cylinder provided with a threaded bore, a screw threaded into the bore, means for inhibiting the screw from turning, means comprising a cam for rotating the piston in the cylinder, and snap action means for at times preventing said rotating means from rotating the piston.

6. A wheel cylinder assembly for operating a hydraulic brake or the like comprising a cylinder, a piston in the cylinder provided with a threaded bore, a screw threaded into the bore, means for inhibiting the screw from turning, means for rotating the piston in the cylinder, and snap action means comprising a thermostatic element for preventing the operation of the last named means.

7. In a brake for an automobile, a brake drum, a pair of identical shoes in the drum, a pair of anchors interposed between the shoes, each comprising means to receive the anchoring torque of one shoe in one direction of rotation of the drum and of the other shoe in the opposite direction of rotation of the drum, and means controlled by a thermostat to automatically adjust the relative position of the shoes and the anchors to compensate for wear of the shoes, the last named means comprising a wheel cylinder, a piston in the cylinder provided with a threaded bore, a screw threaded into the bore, means for inhibiting the screw from turning and means for rotating the piston in the cylinder.

8. In a brake comprising a brake drum, a brake shoe and means for moving the shoe into contact with the drum, means for automatically controlling the adjustment of the brake shoe to maintain a substantially constant clearance between shoe and drum in released position, said means comprising a pair of elements which contact one another to accomplish the automatic adjustment, a heat-actuated member for preventing adjustment of the brakes by moving one of the aforesaid elements away from the other when the brake drum is heated, and a toggle connection between the heat-actuated member and one of the elements for causing the heat-actuated member to move said connected element away from the other of the elements with a snap action.

9. In a brake having a brake shoe and a brake drum, means for automatically adjusting the position of the shoe to compensate for wear of the shoe lining, said means comprising a pawl and ratchet for cooperating to adjust the position of the shoe, and mechanism including a toggle device for at times moving the pawl out of contact with the ratchet teeth with a snap action so that partial engagement of the pawl with the ratchet teeth is inhibited.

10. An automatic adjusting device for brakes comprising two adjacent parts one of which at times moves the other to accomplish adjustment, means for preventing the operation of the device when overheated, and means actuated by the aforesaid means for separating the two said parts, the last named means comprising a spring which tends to resist separation of the said parts until a load has been built up by the preventing means and then tends to hold the said parts separated.

11. In a brake having a brake shoe and a brake drum, means for automatically adjusting the position of the shoe to compensate for wear of the shoe lining, said means comprising a pawl and ratchet for cooperating to adjust the position of the shoe, and mechanism including a toggle device for at times moving the pawl out of contact with the ratchet teeth with a snap action so that partial engagement of the pawl with the ratchet teeth is inhibited.

12. An automatic adjusting device for brakes comprising two adjacent parts one of which at times moves the other to accomplish adjustment, means for preventing the operation of the device when overheated, and means actuated by the aforesaid means for separating the two said parts, the last named means being adapted to resist separation of the said parts until a load has been built up by the preventing means and then to hold the said parts separated.

13. An automatic adjusting device for brakes comprising two adjacent parts one of which at times moves the other to accomplish adjustment, means for preventing the operation of the device when overheated, and snap action means actuated by the aforesaid means for separating the two said parts.

STANLEY I. MacDUFF.